UNITED STATES PATENT OFFICE.

HARRY W. MORSE AND LEDYARD W. SARGENT, OF CAMBRIDGE, MASSACHUSETTS.

PROCESS OF TREATING FELDSPAR.

1,041,327.  Specification of Letters Patent.  Patented Oct. 15, 1912.

No Drawing.  Application filed February 28, 1911. Serial No. 611,524.

*To all whom it may concern:*

Be it known that we, HARRY W. MORSE and LEDYARD W. SARGENT, citizens of the United States, and residents of Cambridge, in the county of Middlesex and State of Massachusetts, have invented a certain new and useful Process of Treating Feldspar, of which the following is a specification.

This invention relates particularly to a process for the production of potassium in a form available for fertilizer and manufacturing purposes.

It is well known that potassium is contained in feldspar and feldspathic rocks, but the cost of obtaining this potassium in available form for fertilizing and manufacturing purposes has long prevented the use of these rocks for this purpose.

The object of this invention is to provide an easy, efficient and economical method of obtaining potassium from rocks which contain, with or without other constituents, potassium, aluminum, and silica.

The process consists of subjecting feldspar at an elevated temperature, first, to the action of a sulfate of calcium (as gypsum), and, secondly, to that of an alkali chlorid (as common salt), or an alkaline earth chlorid (as calcium chlorid), whereby are produced valuable oxids of sulfur, a soluble compound of potassium and a residual material capable of being converted easily into Portland cement. It is the production of the oxids of sulfur and the cement material in connection with that of the soluble potassium compound that makes possible the economical manufacture of the latter.

The following is an example of the way in which the process can be carried out in the case of a typical commercial, orthoclase feldspar containing about eight per cent. or nine per cent. of potassia. The proportions and other data may be varied and are given here only as an example. A thorough mixture of ground orthoclase and ground gypsum is prepared, composed of twenty parts of gypsum to ten parts of orthoclase, and is strongly heated at a temperature of about 1000° C. for several hours in a muffle or open hearth furnace until the evolution of the oxids of sulfur has greatly diminished or has ceased entirely. It is desirable that the temperature should not rise high enough to cause fusion of the mixture. Through the flues the oxids of sulfur and other gases are led off, and subjected to whatever form of treatment is preferred. For example the oxids of sulfur can be converted into sulfuric acid by the chamber or contact process, after suitable preliminary treatment, or used for making alkaline sulfates by being caused to react, with air and steam, on alkaline chlorids. After this heating about four parts of common salt is mixed in, after cooling if preferred, and the resulting mixture is subjected to further heating, at a temperature of about 600° C. We prefer to use a lower temperature than before or at least such as will preclude excessive volatilization of alkali. Chlorin and (in the presence of moisture) some hydrochloric acid is here evolved, depending upon the temperature and time of heating and the amount of water-vapor present. Finally the heated material, which is in a pulverulent or loosely compact state, is thoroughly extracted with water, preferably hot to hasten the action, whereby a soluble compound of potassium and a portion of the salt added, are dissolved.

By adding the alkali chlorid after the bulk of the volatile compounds of sulfur have been driven off and heating with care to avoid volatilization of alkali chlorid, the yield of soluble potassium salt is increased over that resulting from a simultaneous heating with sulfate and chlorid.

The process may be varied, if desired, by subjecting the feldspar to the action of sulfate of calcium and of an alkali chlorid simultaneously at a temperature of from 900° to 1100° C.

The proportion of gypsum to rock must not be less than a minimum value which depends upon the rock used. Above this minimum amount, however, an excess may be used amounting to several times the minimum amount, depending upon the rock. Thus, with the above lot of orthoclase, no difficulty is experienced in causing four parts of gypsum to react with one part of orthoclase. If too much sulfate is used, its decomposition by reaction with the rock is incomplete. There is also a minimum proportion of chlorid to rock which it is necessary to use in order to liberate the potash. This amount depends upon the rock used.

Instead of using an alkali chlorid, an alkaline earth chloride (as calcium chlorid) can be used, and in the subjoined claim we include the latter in the expression alkali chlorid. In the case of an alkaline earth chlorid the base enters into insoluble combination with the silica.

The residue from the hot water extraction consists largely of silicates of aluminum, lime, and sodium. The proportion of silica to aluminum will usually be right for the preparation of Portland cement. What lime is needed in addition to that afforded by the rock itself and the reagents added can be added to the residue, or at any other stage preferred. Other constituents can also be added at this stage as desired. The material may be treated in a manner analogous to the burning of Portland cement. The high temperature of this treatment should suffice to set free any objectionable excess of sulphur not liberated before.

The chlorin evolved during the chlorid treatment can be recovered as such by suitable absorbing apparatus, or used in the manufacture of hydrochloric and sulfuric acids by being caused to react with sulphur dioxid, obtained from the sulfate heating, according to known methods or treated in any way preferred.

The compounds evolved during the sulfate heating consist almost entirely of sulfer dioxid ($SO_2$) and sulfur trioxid ($SO_3$) in amounts depending upon the temperature of the heating, the moisture present, catalytic substances, and other conditions among which are the regulation and kind of fuel, draft, and furnace.

As used in the following claims the term feldspar includes feldspathic rock.

Having thus described our invention, what we claim as new and desire to secure by Letters Patent, is:

1. In the herein described process of treating feldspar the improvement which consists in heating the feldspar first with sulfate of calcium and then heating the non-volatilized residue with alkali chlorid, whereby a soluble compound of potassium is produced.

2. The process of treating feldspar which consists in strongly heating finely divided feldspar in the presence of finely divided sulfate of calcium, but without fusion of the mixture, whereby oxids of sulfur are evolved, then strongly heating the non-volatilized residue in the presence of finely divided alkali chlorid, and treating the non-volatilized residue with water whereby a soluble compound of potassium is dissolved substantially as described.

3. The process of treating feldspar which comprises strongly heating an intimate mixture consisting of feldspar and sulfate of calcium, but without fusion of the mixture, whereby oxids of sulfer are evolved, then strongly heating an intimate mixture consisting of the non-volatilized residue and sodium chlorid and treating the non-volatilized residue with water whereby a soluble compound of potassium is dissolved, substantially as described.

4. The process of treating feldspar which comprises subjecting feldspar, at an elevated temperature, to the action of sulfate of calcium and of an alkali chlorid, and treating the non-volatilized residue with water, whereby a soluble compound of potassium is dissolved, substantially as described.

5. The process of treating feldspar which consists in subjecting feldspar, at a temperature below that at which fusion of the mixture takes place, to the action of sulfate of calcium, thereafter subjecting the mass at a lower temperature to the action of sodium chlorid and then extracting a soluble compound of potassium by subjecting the mass to the action of water.

6. The process of treating feldspar which comprises subjecting feldspar, at a temperature below that at which fusion of the mixture takes place, to the action of sulfate of calcium and of an alkali chlorid, whereby a soluble compound of potassium is produced, substantially as described.

7. In the herein described process of treating feldspar, the process which comprises subjecting feldspar, at an elevated temperature, to the action of gypsum and of sodium chlorid, whereby a soluble compound of potassium is produced, substantially as described.

HARRY W. MORSE.
LEDYARD W. SARGENT.

Witnesses:
GRACE R. HAM,
ALBERT F. AMEE.

Copies of this patent may be obtained for five cents each, by addressing the "Commissioner of Patents, Washington, D. C."